United States Patent [19]

Gibb et al.

[11] Patent Number: 4,944,905

[45] Date of Patent: Jul. 31, 1990

[54] PARTICULATE CERAMIC USEFUL AS A PROPPANT

[75] Inventors: James L. Gibb, Woodbury, Minn.; James A. Laird, St. Joseph, Wis.; George W. Lee, St. Paul; William C. Whitcomb, Cottage Grove, both of Minn.

[73] Assignee: Minnesota Mining and Manufacturing Company, St. Paul, Minn.

[21] Appl. No.: 820,013

[22] Filed: Jan. 21, 1986

Related U.S. Application Data

[62] Division of Ser. No. 571,739, Jan. 18, 1984, Pat. No. 4,680,232.

[51] Int. Cl.$^5$ .............................................. B29B 9/00
[52] U.S. Cl. ......................................... 264/62; 264/56; 264/63; 264/117; 264/125
[58] Field of Search .................. 264/117, 63, 59, 125, 264/56, 62

[56] References Cited

U.S. PATENT DOCUMENTS

| | | | |
|---|---|---|---|
| 2,566,117 | 8/1951 | Christie, Jr. et al. | 117/100 |
| 3,486,706 | 12/1969 | Weyand | 241/184 |
| 3,690,622 | 9/1972 | Brunner et al. | 259/169 |
| 4,427,068 | 1/1984 | Fitzgibbon | 166/280 |
| 4,440,866 | 4/1984 | Lunghofer et al. | 267/117 X |

FOREIGN PATENT DOCUMENTS

| | | |
|---|---|---|
| 1117987 | 9/1982 | Canada . |
| 087852 | 9/1983 | European Pat. Off. . |
| 101855 | 7/1984 | European Pat. Off. . |
| 116369 | 8/1984 | European Pat. Off. . |
| 2948584 | 7/1979 | Fed. Rep. of Germany . |
| 2921336 | 12/1979 | Fed. Rep. of Germany . |
| 3223024 | 12/1983 | Fed. Rep. of Germany . |
| 2037727 | 7/1980 | United Kingdom . |

OTHER PUBLICATIONS

Cutler, R. A. and Jones, A. H., "*Lightweight Proppants for Deep Gas Well Stimulation*", U.S. DOE, 1982.
Ries, H. B., "Build-up Granulation", Aufbereitungs-Technik, 1971.

*Primary Examiner*—Sam Silverberg
*Assistant Examiner*—Mary Lynn F. Theisen
*Attorney, Agent, or Firm*—Donald M. Sell; Walter N. Kirn; Douglas B. Little

[57] ABSTRACT

Process for making particulate ceramics having an alumina rich region near their surface, comprising the following steps:
(a) mixing and pelletizing, with the aid of water, raw materials including a mineral particulate such as nepheline syenite and a binder such as bentonite;
(b) drying the wet pellets from step (a);
(c) mixing the dried pellets with alumina parting agent; and
(d) firing the mixture of pellets and parting agent at a sufficient temperature (less than 1450° C.) and for sufficient time for vitrification to occur.

12 Claims, 2 Drawing Sheets

PARTICULATE CERAMIC USEFUL AS A PROPPANT

This is a division of application Ser. No. 571,739, filed Jan. 18, 1984, now U.S. Pat. No. 4,680,230.

TECHNICAL FIELD

This invention relates to an improved particulate material having utility, among others, as a proppant in hydraulic fracturing. The invention also relates to the fracturing of subterranean formations surrounding wells using the new particulate material described herein.

BACKGROUND

Hydraulic fracturing is the well stimulation technique designed to increase the productivity of a well, such as an oil well, by creating highly conductive fractures or channels in the producing geologic formation around the well. The process involves injecting a fluid at a high rate and high pressure to rupture the formation and create cracks in the rock and pumping into these cracks a fluid containing a particulate material (propping agent or proppant) to maintain the cracks or fractures open by resisting the forces which tend to close the fractures. Thus, the function of the propping agent is to provide high permeability in the propped fracture. Hydraulic fracturing has been used with increasing frequency to improve the productivity of gas and oil wells in low permeability reservoirs.

The list of materials used in proppants is rather long and includes: sand (the most common proppant), nut shells, aluminum and aluminum alloys, wood chips, crushed coke, granulated slag, pulverized coal, crushed rock, granules of metal such as steel, sintered bauxite, sintered alumina, refractories such as mullite and glass beads. Although sand is still the most prevalent proppant, at closure stresses encountered in deep formations, it tends to disintegrate, producing fines or fragments which can reduce permeability of the propped fracture This tendency begins at closure stresses above about 5,000 psi (34.5 MPa).

The proppants recently developed to withstand increased overburden pressure in deeper wells are sintered bauxite (see e.g. U.S. Pat. No. 4,068,718) and zirconium oxide (see U.S. Pat. No. 4,072,193). Coated proppants have also been proposed in the patent literature (see U.S. Pat. No. 3,376,930 on metal coated proppants and U.S. Pat. No. 3,026,938 on plastic coated proppants).

Sintered bauxite has high sphericity and good chemical stability in well formations. However, its cost is much greater than that of the more common sand proppants. Since the specific gravity of bauxite is substantially greater than sand, the cost per unit volume of bauxite is even more expensive than sand.

The higher specific gravity of bauxite affects the transport of the proppant into the fracture. Generally speaking, lower specific gravity proppants can be carried further into fractures than those of higher specific gravity. Lower specific gravity proppants permit decreases in pumping rates during proppant placement which in turn reduces bottom hole pressure. The reduction of bottom hole pressure is felt to limit the vertical propagation of fractures (horizontal propagation being desired). In addition, lower proppant density allows for the use of less expensive fracturing fluids.

According to a study done for the U.S. Department of Energy, published in April 1982 (Cutler, R. A. and Jones, A. H., "Lightweight Proppants for Deep Gas Well Stimulation' DOE/BC/10038-22) an ideal proppant for hydraulic fracturing would have a specific gravity less than two, be able to withstand a closure stress of 138 MPa, be chemically inert in brine at temperatures to 200° C., have perfect sphericity (a Krumbein roundness of 1), cost the same as sand on a volume basis, and have a narrow proppant size distribution. The same report admits that such a proppant is not likely to be forthcoming in the foreseeable future; however, it states that a proppant capable of withstanding closure stresses of 85 MPa, having a specific gravity of 2.6 to 3 and costing $\frac{1}{3}$ to $\frac{1}{2}$ the price of bauxite would solve about 90% of the current hydraulic fracturing problems.

DISCLOSURE OF INVENTION

A new ceramic composition is hereinafter described which is well suited to use as a proppant.

The inventive material is defined as a particulate ceramic made from raw materials which comprise about:

50-97 parts by weight of mineral particulates;
3-50 parts by weight alumina; and at least one part (typically less than 10) by weight binder;
wherein the mineral particulates comprise a ceramic mineral which melts below about 1300° C., does not substantially sublime or volatilize below 1300° C., vitrifies upon cooling, and has a fired density of less than about 2.9 grams per cubic centimeter;
wherein the binder is characterized by adhering the mineral particulate and alumina powder together after pelletizing but before firing; and wherein the particulate ceramic itself is characterized by:
  (i) a concentration gradient of alumina from the center to the surface of the particles; and
  (ii) a fired density less than about 2.9 grams per cubic centimeter.

For purposes of this description, the term "mineral particulate(s)" means the raw material mineral from which the inventive ceramic is made, and the term "particulate ceramic" refers to the inventive composition.

The inventive ceramic may be considered a two phase ceramic, having a vitreous matrix phase resulting mainly from the fusion of the mineral particulates or fines and an alumina phase existing as alumina crystals within the vitreous phase.

Nepheline syenite mineral is one mineral which has been found suitable as the mineral particulate raw material. A typical composition of nepheline syenite is as follows: 60% Orthoclase, 10% Nepheline, 10% Hornblende, 5% Diopside, 15% Accessory Minerals (titanite, apatite, magnetite and biotite) and trace amounts of secondary minerals (e.g. kaolinite and analcite). The particular material used in the development of the present invention was nepholine syenite having a specific gravity of about 2.6. It was believed to contain small amounts of pyrite.

Other examples of minerals which may be used are: basalt, feldspar, shale, argillite, pyroxene and mixtures of these minerals. Although the description that follows refers mainly to nepheline syenite, the other mineral particulates may be utilized in a similar manner.

Typical binders useful as raw materials in this invention are bentonite (preferably sodium bentonite), sodium silicate, cellulose gum and sodium lignosulphonate.

The term "fired density" as used above means the density of the mineral after it has been melted or fired and cooled to ambient temperature.

The particulate ceramic of this invention has an alumina concentration higher at the surface of the particles than in the center. The particles also may have a closed cell microporosity Which helps to lower the density. The diameter of the inventive ceramic particles is generally about 0.3 to 2.0 millimeters, and they usually have a Krumbein roundness of 0.8 or higher. The inventive particulates are chemically stable, and they can be made to have a very good strength to resist closure stresses in rock formations.

As a proppant, the inventive composition offers several advantages:

lower raw material costs than sintered bauxite proppants;

lower firing temperature than sintered bauxite (ranging from about 1100° C. to 1310° C. as compared to about 1450°–1550° C. for bauxite) superior crush resistance to sand;

fracture conductivity which is superior to sand;

specific gravity which is lower than that of bauxite and nearly the same as sand; and bulk density which is substantially lower than that of bauxite and lower than that of sand.

The scope of this invention includes fluids containing the particulate ceramic described herein as a proppant. The constituents of such fluids, except for the inventive ceramic, are well known in the art of hydraulic fracturing.

BRIEF DESCRIPTION OF THE DRAWINGS

FIG. 3 shows a region near the center of the particle of FIG. 2, and FIG. 4 shows a region near the surface of the particle shown in FIG. 2.

DETAILED DESCRIPTION

Figure 1:
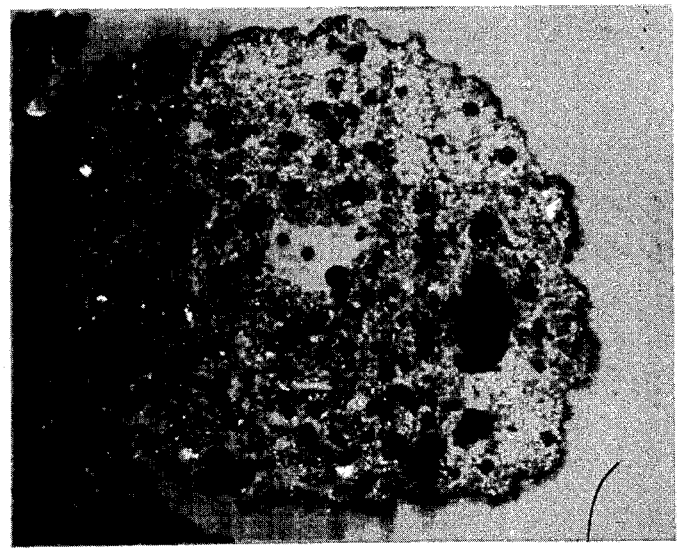
FIG. 1 is an optical photomicrograph of a cross section of a ceramic particle of this invention magnified 150 X.

The inventive particulate ceramics are made by a process comprising several steps. In the first step, binder, alumina, mineral particles and water are mixed and pelletized in order to form spheroid particles. The mineral particle material used in the research and development which led to the present invention was obtained as Kylo-LR mineral from Minnesota Mining and Manufacturing Company.

The type of mixer which is used in the first process step is important since it has several imPortant functions. It must process the mineral and alumina into unfired spheroids having a high Krumbein roundness, and it should do this at a relatively high yield of particles in the range of 1.19 to 0.59 millimeters in largest dimension (16–30 mesh). Several types of mixing apparatus may be applied. Balling pans or disk agglomerators, found in the mining industry, may be used.

Machines known as high energy mix pelletizers are best suited to this application. Two examples of such machines are the Littleford mixer and the machine known as the Eirich Machine. The Eirich machine is described in U.S. Pat. No. 3,690,622. This machine comprises basically a rotatable cylindrical container, the central axis of which is at an angle to the horizontal, one or more deflector plates, and at least one rotatable impacting impeller usually located below the apex of the path of rotation of the cylindrical container. The rotatable impacting impeller engages the material being mixed and may rotate at a higher angular velocity than the rotatable cylindrical container itself.

There are four basic steps in making the spheroids in high energy mix pelletizer: (1) mixing the dry powders at high speed; (2) nucleation or seeding at which time water is added to the region of the mix pelletizer near the impacting impeller to be dispersed into droplets and aid in the formation of tiny grains of the mineral to which the particles of mineral and alumina may become adhered; (3) growth of the spheroids in the manner of a snow ball with the powder agglomerating on the tiny grains during which time the impacting impeller rotates at a slower speed than it did during the nucleation step; and (4) polishing or smoothing the surfaces of the spheroids by turning off the impacting impeller and allowing the cylindrical container to rotate. This last operation is similar to a balling pan.

The amount of binder generally comprises about one to five weight percent of the dry materials fed to the mix pelletizer.

The wet spheroids or prill are discharged from the mix pelletizer and dried at a temperature of about 40° to 200° C. The dried spheroids are then typically screened to obtain a mesh size of 16/30 mesh (1.19 to 0.59 mm.) for further processing. The particle size range selected is actually larger than the desired end product because of the shrinkage of the spheroids during firing.

The spheroids are next mixed with a parting agent which is typically alumina. However, zircon and talc may also be useful. Silica has been used, but it poses the possible danger of silicosis to workers handling the raw material. Although the description which follows deals mostly with alumina parting agent, the other parting agents could be used in proportions and particle sizes similar to the alumina. A further refinement is to use alumina of two particle size distributions, one very fine to coat and react with the spheroids and another coarser material to act as inert spacers between spheroids and aid the flow of material through the kiln. The spheroids and parting agent may be mixed in a tumbling mixer such as a twin shell mixer or a cement mixer.

The next step is to feed, typically by means of a vibratory feeder, the mixture of parting agent and spheroids to a rotary kiln. The amount of parting agent usually ranges between about 5 and 40 weight percent of the material fed to the kiln, but the optimum, is determined by trial and error. If the spheroids agglomerate together or stick to the kiln walls prior to reaching vitrification temperature, then additional parting agent is required. Thus, the function of the parting agent is to prevent the spheroids from agglomerating or sticking to the kiln walls. When alumina s added in a small particle size portion in the kiln, it also serves to strengthen the particles by reacting with the spheroids and forming an outer layer on the spheroids which is very rich in alumina concentration, which increases the strength of the final product. The material remains in the kiln for sufficient time to vitrify the mineral phase.

The vitrification step, also called firing, may be done statically, but a rotary kiln is the preferred apparatus for this step. The residence time of the spheroids in the kiln is dependent upon several parameters: kiln length, diameter, angle, and rotational speed, feed rate to the kiln, temperature within the kiln, particle size of the spheroids, and shape of the particles. Residence time is adjusted to achieve the desired properties with each specific formulation for a given end use. A typical residence time in the kiln corresponds to 20 minutes or more. As residence time becomes shorter, the process is more difficult to control because some spheroids may not be subjected to the correct thermal history and thus not attain the desired strength. A shorter residence time can also have the effect of lowering the density of the final product but at the expense of crush strength. There is no particular advantage to residence times which are longer than the optimum. However, a given particle can be made at lower temperatures if longer residence times are used.

Typically, the kiln temperature is initially set low and then raised in stages at a given residence time until the maximum crush strength is attained in the end product. This corresponds to the optimum firing condition.

The product from the kiln is screened to obtain the desired particle size fraction, usually about 18/40 mesh (1.0 to 0.42 mm.). Either before, during or after this screening step, the spheroids may be subject to vigorous agitation by air or some other agitation means in order to remove dust from their surfaces. This is known as the "dedusting" step. After dedusting, the product may be mixed with parting agent and passed through the kiln another time to build up the outer alumina layer and increase particle strength.

The alumina gradient within the spheroids is achieved in several ways. The particle size of the mineral fed to the high energy mix pelletizer is substantially coarser than the particle size of the alumina fed to the mix/pelletizing step. Thus, the coarser mineral particles serve as the seeds on which are coated the alumina and the fine portion of the mineral particles themselves. The core of the final product is mostly vitrified mineral; whereas, the outer region of the ceramic particles has a higher concentration of alumina. This gradient in alumina depends upon the diameter of the mineral seed relative to the diameter of the final spheroid. If a higher alumina gradient is desired, then mineral feed having a coarser size distribution is selected.

The firing of the spheroids in alumina powder parting agent is another means by which the alumina gradient is achieved. Under the firing conditions in the kiln, the alumina powder, especially the fine fraction, absorbs into and/or adsorbs onto the spheroids to form an outer layer rich in alumina concentration. Higher firing temperatures in the kiln result in steeper alumina gradients, because more alumina is consumed and contained in the outer surface region of the spheroids. In fact, it is possible to make the inventive Particulate ceramics without introducing any alumina to the mix pelletizer, but by relying on the alumina parting agent to adhere or adsorb onto the vitreous spheroids or pellets in the kiln to form a hard outer layer or shell.

Means for evaluating the properties of proppants are found in American Petroleum Institute Publications such as: "API Recommended Practices for Testing Sand Used in Hydraulic Fracturing Operations" API RP 56, 1st Edition, (March, 1983) and "API Recommended Practices for Testing High Strength Proppants Used in Hydraulic Fracturing Operations", 3rd Edition, January, 1983. Two important parameters for evaluating proppants are crush strength or crush resistance and fracture conductivity. Crush strength indicates the extent to which the proppant material will actually perform its function of propping up the rock formation, standing as a pillar within the fracture and resisting the crushing pressure of the formation. Crush strength is measured by placing a sample of proppant material into the 2.25 inch (57 mm.) internal diameter die cavity of a test apparatus. The test volume of the proppant sample is equivalent to the volume occupied by 4 pounds/ft$^2$ (1.95 g./cm$^2$) of 20/40 mesh (0.85/0.425 mm) frac sand in the test cell. A steel plunger or piston applies pressure to the ceramic inside the cavity at a rate of 1 minute to achieve the test pressure (e.g. 10,000 psi or about 69 MPa), and 2 minutes at test pressure after which the pressure is released. The sample is screened between 20, 40 and 50 mesh (0.85, 0.425 and 0.297 mm). screens for 10 minutes on a rotap screen vibrator, and the percentage of fines less than 0.425 mm. in largest dimension and also the percentage of fines less than 0.297 mm. in largest dimension is recorded. It is desired to minimize the weight percent fines produced in the crush strength test.

Fracture conductivity is a measure of the flow rate of fluid which can be conducted through a fracture under given conditions. It is measured in millidarcy-feet (md-ft) at various applied pressures. Both crush strength and fracture conductivity values typically decrease with increasing applied pressure. However, the relationship of this decrease with pressure varies significantly with the type of proppant used.

Density is determined according to ASTM Standard D-2840-69 by weighing a sample, measuring the volume of the sample with an air comparison pycnometer (Beckman Instruments Model 930) and calculating the weight per cubic centimeter.

The invention will be further clarified by a consideration of the following examples, which are intended to be purely exemplary.

EXAMPLES I-V

For Example I, a dry ceramic mix of:
3,500 g nepheline syenite obtained as Kylo-LR Grade C;
3,500 grams alumina <325 mesh (<45 micrometers); and
210 grams sodium bentonite obtained as Volclay bentonite from American Colloid Company;
was blended for one minute in a mix pelletizer (Eirich Machines, Inc., Model RV02) with the cylindrical container rotating at about 66 rpm. The impacting impeller had vanes or deflecting blades of two sizes, 125 and 185 mm long, and the impacting impeller was rotated at the high speed setting of 2,230 rpm. Then 1,050 ml. of water was added over a period of about 45 seconds. After the mix pelletizer ran an additional 1.25 minutes to form seeds, the impacting impeller was set at low speed, 1,115 rpm, for about 8 minutes to grow the particles to the desired size. Then, the impacting impeller was turned off, and the particles were smoothed for an additional eight minutes to form spheroids, after which the rotation of the cylindrical container was terminated. The particle size distributions for the raw materials, as measured by a Microtrac instrument from Leeds & Northrup Company are given in Table 1.

Table 2 gives the amount of raw materials for Examples I-V, as well as other process parameters such as the mixing times and bulk densities. Bulk density was measured by pouring the material as formed into a container of known volume, leveling off the top surface with a straight edge and recording the weight.

The wet spheroids were dumped from the mix pelletizer into flat trays and dried for 18 hours at about 121° C. in an oven. The dried spheroids were screened to obtain 16/30 and 30/40 mesh (1.19/0.59 mm. and 0.59/0.42 mm.) fractions. Then, 500 grams of the unfired spheroids containing 60% of the 1.19/0.59 mm. and 40% of the 0.59/0.42 mm. fractions were mixed with 55.5 grams of <325 mesh (<45 micrometer) particle size alumina powder in a 3.79 liter plastic jar by rotating the jar by hand, being careful not to destroy the integrity of the spheroids. An additional 55.5 grams of coarse alumina powder was added to the jar, and the material was again mixed by rotating the jar. The resulting mixture contained about 81.8 weight percent unfired spheroids, 9.1 weight percent fine grade alumina and about 9.1 weight percent course grade alumina powder.

The mixture was fed into a rotating tube kiln at a rate of about one to two grams per minute. The kiln was characterized by a tube about 1,400 mm. long and about 64 mm. internal diameter rotating at about 4 rpm and inclined at a two degree angle. It took approximately 25 minutes for the material to travel the length of the tube. The fired material discharged from the kiln was screened, and the screened spheroids were vigorously agitated to remove dust.

The same procedures as described above were used in the preparation and evaluation of Examples II–V. In terms of weight percent, the raw materials fed to the mix pelletizer are given in Table 3. The properties of the fired spheroids are given in Table 4.

TABLE 1

| Particle Size in Micrometers | Weight Percent of Sample Larger Than Stated Particle Size | | |
|---|---|---|---|
| | Nepheline Syenite | | |
| | Kylo-LR Grade C | Kylo-LR Grade F | Alumina |
| 125 | 2.6 | 0 | 0 |
| 88 | 4.4 | 0 | 0 |
| 62 | 18 | 0 | 0 |
| 44 | 29.9 | 3.8 | 0.7 |
| 31 | 36.6 | 16.2 | 5 |
| 22 | 41.9 | 29.1 | 5 |
| 16 | 58.1 | 38.1 | 5.4 |
| 11 | 74.8 | 51.1 | 18.4 |
| 7.8 | 74.8 | 61.9 | 35.3 |
| 5.5 | 75 | 66.0 | 54.3 |
| 3.9 | 86.4 | 78.9 | 75.2 |
| 2.8 | 98.3 | 91.6 | 91.2 |
| 1.9 | 100 | 100 | 100 |

TABLE 2

| Example | Raw Material Amounts (grams) | | | | | Mix/Pelletizer Times (minutes)* | | Dry Spheroid Bulk Densities (g/cc) | |
|---|---|---|---|---|---|---|---|---|---|
| | kylo Gr. C | kylo Gr F | Al$_2$O$_3$ | Bentonite | H$_2$O (ml) | Add H$_2$O | Seed | 0.85/0.59 mm | 0.59/0.42 mm |
| I | 3500 | | 3500 | 210 | 1050 | 0.75 | 1.25 | 1.19 | 1.15 |
| II | | 3500 | 3500 | 210 | 1120 | 0.75 | 1.25 | 1.20 | 1.19 |
| III | | 4200 | 2800 | 210 | 1070 | 0.75 | 1.25 | 1.14 | 1.11 |
| IV | 4200 | | 2800 | 210 | 1040 | 1 | 1 | 1.18 | 1.15 |
| V | 1925 | 1925 | 3150 | 210 | 1050 | 0.75 | 1.25 | 1.19 | 1.16 |

*For all examples, initial mix time was about 2 minutes, time for growth of the spheroids was 8 minutes, and smoothing time was 8 minutes.

TABLE 3

| Example | Weight Percent of Mix Pelletizer Feed | | | |
|---|---|---|---|---|
| | Kylo-LR | | | |
| | Grade C | Grade F | Al$_2$O$_3$ | Bentonite |
| I | 48.5 | | 48.5 | 3.0 |
| II | | 48.5 | 48.5 | 3.0 |
| III | | 58.3 | 38.8 | 2.9 |
| IV | 58.3 | | 38.8 | 2.9 |
| V | 26.7 | 26.7 | 43.7 | 2.9 |

TABLE 4

| Example | Kiln Temperature (°C.) | Bulk Density (g/cc) | | Density Particulate Ceramic (g/cc) | | Crush Strength at 69 MPa | |
|---|---|---|---|---|---|---|---|
| | | 0.85/0.59 mm | 0.59/0.42 mm | .85/.59 mm | .59/.42 mm | Weight % <0.42 mm | Weight % <0.297 mm |
| I | 1245 | 1.55 | 1.58 | 2.86 | 2.87 | 8.0 | 4.0 |
| I | 1255 | 1.52 | 1.54 | 2.84 | 2.88 | 7.8 | 3.8 |
| II | 1230 | | | 2.83 | 2.85 | 9.1 | 2.7 |
| II | 1245 | 1.54 | 1.55 | 2.83 | 2.86 | 6.9 | 3.8 |
| II | 1285 | | | 2.50 | 2.47 | 32.4 | 22.8 |
| III | 1220 | 1.54 | 1.57 | 2.71 | 2.74 | 13.5 | 6.8 |
| III | 1225 | 1.53 | 1.55 | 2.70 | 2.75 | 11.1 | 5.6 |
| III | 1235 | 1.50 | 1.50 | 2.66 | 2.69 | 16.1 | 9.4 |
| IV | 1220 | 1.52 | 1.52 | 2.71 | 2.76 | 10.2 | 5.8 |
| IV | 1230 | 1.53 | 1.56 | 2.68 | 2.75 | 9.1 | 4.8 |
| IV | 1240 | 1.50 | 1.56 | 2.61 | 2.69 | 11.3 | 6.5 |
| IV | 1250 | 1.46 | 1.47 | 2.60 | 2.68 | 12.1 | 6.7 |
| V | 1230 | 1.52 | 1.52 | 2.73 | 2.69 | 9.0 | 4.8 |
| V | 1240 | 1.55 | 1.56 | 2.69 | 2.76 | 7.9 | 4.1 |
| V | 1250 | 1.51 | 1.52 | 2.67 | 2.75 | 8.2 | 4.2 |

The Photomicrograph figures depict cross sections of proppants made in accordance with the above-described process. In the optical photomicrograph, FIG. 1, the black spots represent voids which give the porosity and desired low density. From this photograph it can be seen that the voids are distinct microscopic closed cells (i.e. closed cell microporosity) as opposed to being interconnected. The portion which was the seed can be discerned in the center, and the mix of vitreous phase and crystalline alumina. Phase (with micropores) can be seen surrounding the center or core. The core is apparently made of just the vitreous phase. The dark colored outer layer or surface region of the particle contains the highest alumina concentration.

Figure 2:
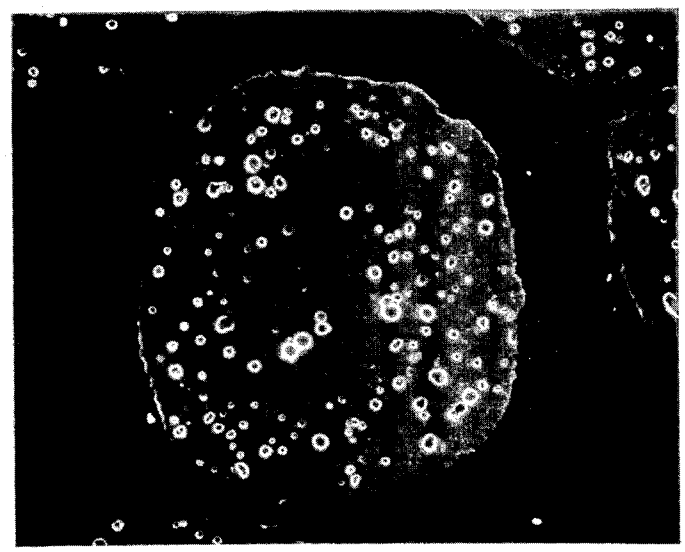
FIG. 2 is a scanning electron microscope (SEM) photomicrograph of a cross section of a ceramic particle of this invention.
Figure 3:
FIGS. 3 and 4 are SEM photomicrographs of regions of the particle shown in FIG. 2, but at higher magnification.
Figure 4:

FIG. 2 is an SEM photomicrograph of a cross-section of another proppant. The regions which appear to be bubbles are the voids. The alumina concentration gradient is made more clear by a comparison of FIGS. 3 and 4. FIG. 3, taken at higher magnification near the center of the proppant cross-section shows the absence of alumina crystallites, FIG. 4 taken at the same magnification near the surface of the proppant shows a rather high concentration of alumina crystallites, which are seen to be dispersed in the vitreous phase which appears as the continuous dark gray color throughout the proppant.

EXAMPLE VI

A dry ceramic mix of 7,000 grams nepheline syenite (obtained as Kylo LR-Grade F and 175 grams of bentonite (obtained as Volclay 200) was blended for 1 minute in a high energy mix pelletizer. After the initial blending, 1,050 ml. of water was added in 0.5 minutes. 1.5 minutes was used for seeding, 6 minutes for growth of the spheroids, and 6 minutes for smoothing. The product from the mix pelletizer was dried in trays at about 135° C. and screened to 14/30 mesh (1.41/0.59 mm). The dried spheroids were blended with fine (less than 325 mesh, <45 micrometers) alumina and coarse grade (40.5–133 micrometer, 80 micrometer mean particle size) alumina (each grade of alumina comprising about 10 weight percent of the total mixture). This mixture was fed into a rotary kiln at a rate of about 10 grams per minute. This kiln was about 1.8 meters long and about 14 cm internal diameter and rotated at about 2 rpm at an inclination of about 3°. Average residence time in the kiln was approximately 25 minutes. The spheroids were fired at 1140° C., had a density of 2.44 g/cc. and had an outer layer or shell comprising mostly alumina which had adhered to the vitreous spheroid in the kiln. Crush strength tests on the product of this experiment yielded about 13 weight percent of the sample crushed to under 0.42 mm. at 7,000 psi (48 MPa) applied pressure and about 31 weight percent of the sample crushed to less than 0.42 mm. at an applied pressure of about 10,000 psi (69 MPa). For reference, Jordan, Minnesota sand, which is used as a proppant, was subjected to the same crush test and yielded a 26 weight percent under 0.42 mm. at 48 MPa and 43 weight percent under 0.42 mm. at 69 MPa.

EXAMPLE VII

A dry ceramic mix of:
nepheline syenite 4,000 grams
fine (under 45 micrometers) alumina-4,000 grams; and
bentonite-200 grams
was blended for one minute in a mix pelletizer. 1,250 ml. of water was added in 0.5 minutes. Seeding took 1.5 minutes; growth took about 7 minutes; and smoothing was done in about 4 minutes. The remaining procedure was done the same as in Example VI except that the spheroids were fired at a kiln temperature of about 1,270° C. The properties of the resulting ceramic are compared to a commercial bauxite proppant and Jordan, Minnesota sand in Table 5.

TABLE 5

| | | | Inventive Ceramic | Bauxite | Sand |
|---|---|---|---|---|---|
| Krumbein Roundness | | | 0.8–0.9 | 0.8–0.9 | 0.7–0.8 |
| Specific Gravity | | | 2.8 | 3.6–3.8 | 2.6 |
| Bulk Density g/cc | | | 1.5 | 2.1–2.2 | 1.7 |
| Crush Resistance % Fines 10,000 psi (69 MPa) | | | 4–5 | 3–5 | 41–43 |
| Fracture Conductivity | | | | | |
| md-Ft at in deionized water at 27° C. | 6000 psi | (41 MPa) | 3045 | 3800 | 2210 |
| | 8000 psi | (55 MPa) | 2640 | 3660 | 1630 |
| | 10000 psi | (69 MPa) | 2480 | 3500 | 850 |
| | 12000 psi | (83 MPa) | 1910 | 3360 | 390 |

From the table, it can be seen that the inventive ceramic has a crush resistance comparable to that of bauxite and far better than sand. Also, the data indicate that fracture conductivity, although less than that of bauxite, is far superior to that of sand.

EXAMPLE VIII

An experiment similar to Example VI was made with the following differences: The mineral particulate, instead of being nepheline syenite, was argillite believed to be comprised of: plagioclase feldspar, quartz, clay materials (Illite, Montmorillonite and Sericite), calcite, muscovite, chlorite and iron oxide. An exemplary chemical composition is approximately 65.7% $SiO_2$, 16.9% $Al_2O_3$, 3.3% $Fe_2O_3$, 2.2% CaO, 1.2% MgO, 3.9% $Na_2O$, and 3.5% $K_2O$. A particle size anlaysis of this mineral particulate is given in Table 6 which is like Table 1.

TABLE 6

| Particle Size in micrometers | Weight Percent of Argillite Sample Larger Than Stated Particle Size |
|---|---|
| 88 | 3.6 |
| 62 | 4.8 |
| 44 | 5.1 |
| 31 | 5.1 |
| 22 | 9.7 |
| 16 | 11.3 |
| 11 | 12.0 |
| 7.8 | 25.6 |
| 5.5 | 38.6 |
| 3.9 | 59 |
| 2.8 | 80.9 |
| 1.9 | 100 |

The argillite was obtained as Kylo-W mineral from Minnesota Mining and Manufacturing Company. 1100 ml. of water was added to the mix pelletizer. After drying the mix pelletizer product was screened to obtain a 16/30 mesh (1.19/0.59 mm.) fraction. The rotary kiln was fired at 1191° C. The product had a specific gravity of 2.43 and a crush strength test result of 13.4 weight percent crushed to <0.42 mm. at 48 MPa applied pressure.

It has been found that the coarser grades of mineral particulate raw material are preferred in the process of making inventive ceramic because a higher yield results. It has been theorized that the higher yields are a result of the larger particles furnishing a greater proportion of seeds for the growth of the spheroids in the initial mixing step.

It has also been found that the particle size of the alumina used as the parting agent in the kiln affects the crush strength of the final product. Generally, strength decreases as particle size increases, and therefore, the finer grades of alumina should be present in the parting agent.

Binders used in the ceramic arts are well known and the ones mentioned herein are just exemplary. Others which are suitable are: starch, polyvinyl alcohol, polyvinyl acetate, and clay.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. A process of making particulate ceramics, containing alumina and characterized by a greater alumina concentration near the surface than in the interior of the particles, said process comprising the following steps:
   (a) mixing and pelletizing with the aid of water, raw materials comprising
      a minearl particulate which comprises a ceramic mineral which melts below about 1300° C., does not substantially sublime or volatilize below about 1300° C., vitrifies upon cooling, and has a fired density of less than about 2.9 grams per cubic centimeter;
      particulate alumina having a substantially smaller particle size than the mineral particulate; and a binder characterized by adhering the mineral particulate and alumina together into unified masses after pelletizing, but before firing;
   (b) drying the wet pellets from step (a);
   (c) mixing the dry pellets from (b) with alumina parting agent; and
   (d) firing the mixture from (c) at a sufficient temperature and for sufficient time to vitrify the mineral particulate.

2. The process of claim 1 wherein the mineral particulate is nepheline syenite.

3. The process of claim 1 wherein the mineral particulate comprises a mineral selected from the group consisting of basalt, feldspar, and mixtures thereof.

4. The process of claim 1 wherein the mineral particulate comprises a mineral, selected from the group consisting of shale, argillite, pyroxene, and mixtures thereof.

5. The process of claim 1 wherein the binder is selected from the group consisting of bentonite, sodium silicate, cellulose gum, starch, polyvinyl alcohol, polyvinyl acetate and sodium lignosulphonate and the amount of binder used is from about 1 to 5 weight percent of the dry raw materials in step (a).

6. The process as recited in claim 1 wherein a substantial portion of the alumina parting agent has a particle size distribution less than 45 micrometers.

7. The process of claim 1 which further comprises new steps (e) and (f) as follows:
   (e) mixing the vitrified particulate ceramic from step (d) with alumina parting agent; and
   (f) firing the mixture from step (e).

8. The process of claim 1 wherein the firing temperature is less than 1,450° C.

9. The process of claim 8 wherein the firing temperature ranges from about 1100° C. to about 1310° C.

10. A process of making particulate ceramics, the particles of which have a region near the surface which is rich in alumina concentration compared to the interior of the particles, said process comprising the following steps:
    (a) mixing and pelletizing, with the aid of water, raw materials comprising: a mineral particulate which comprises a ceramic mineral which melts below about 1300° C., does not substantially sublime or volatilize below about 1300° C., vitrifies upon cooling, and has a fired density of less than about 2.9 grams per cubic centimeter; and a binder characterized by adhering the mineral particulates together into unified masses after pelletizing, but before firing;
    (b) drying the wet pellets from step (a);
    (c) mixing the dry pellets from (b) with alumina as a parting agent; and
    (d) firing the mixture from (c) at a temperature less than 1450° C. for sufficient time to vitrify the mineral particulate.

11. The process of claim 10 wherein the alumina parting agent of step (c) comprises quantities of alumina in two different particle size distributions, a first quantity being substantially finer than the average particle size of the dry pellets and a second quantity being substantially coarser than the first.

12. The process of claim 10 wherein the mineral particulate is selected from the group consisting of basalt, shale, pyroxene and mixtures thereof.

* * * * *